United States Patent [19]

Adame

[11] Patent Number: 4,654,630
[45] Date of Patent: Mar. 31, 1987

[54] METHOD FOR FORMING INFORMATION CARRYING SIGNALS IN AN ELECTRICAL POWER SUPPLY NETWORK

[75] Inventor: Javier Adame, Zug, Switzerland

[73] Assignee: LGZ Landis & Gyr Zug AG, Zug, Switzerland

[21] Appl. No.: 697,574

[22] Filed: Feb. 1, 1985

[30] Foreign Application Priority Data

Feb. 29, 1984 [CH] Switzerland ............... 967/84

[51] Int. Cl.$^4$ ........................................... H04M 11/04
[52] U.S. Cl. ................................... 340/310 R; 375/37
[58] Field of Search .......... 340/310 R, 310 A, 825.77, 340/825.78, 345; 375/36, 37; 178/63 R, 63 B

[56] References Cited

U.S. PATENT DOCUMENTS

| 2,688,050 | 8/1954 | Harris | 340/825.77 |
| 3,017,460 | 1/1962 | Alexander | 340/825.77 |
| 3,030,619 | 4/1962 | Ostrov et al. | 340/825.78 |

FOREIGN PATENT DOCUMENTS

| 2705643 | 8/1978 | Fed. Rep. of Germany . |
| 2935769 | 4/1981 | Fed. Rep. of Germany . |
| 2401563 | 3/1979 | France . |
| 404775 | 7/1966 | Switzerland . |

OTHER PUBLICATIONS

Electrical Times, vol. 157, No. 11, Mar. 12, 1970, (London, GB), by A. J. Baggott: "Data Transmission Over Distribution Systems", pp. 55–58.

Primary Examiner—John W. Caldwell, Sr.
Assistant Examiner—David A. Okonsky
Attorney, Agent, or Firm—Marmorek, Guttman & Rubenstein

[57] ABSTRACT

A method for forming and transmitting information carrying signals in an electrical power distribution network is disclosed. A step-shaped current signal is produced by switching at least two purely ohmic loads between a pair of power lines. The ohmic loads are switched between the power lines in accordance with a predetermined sequence so that a current signal having the desired waveform results. The step-shaped information carrying signal usually has a frequency which is higher than the power transmission frequency of the supply network.

16 Claims, 6 Drawing Figures

METHOD FOR FORMING INFORMATION CARRYING SIGNALS IN AN ELECTRICAL POWER SUPPLY NETWORK

FIELD OF INVENTION

This invention relates to a method for forming and transmitting information carrying signals in an electrical power supply network.

BACKGROUND OF THE INVENTION

The primary use of an electrical power supply network is to distribute energy to consumers. Notwithstanding this primary purpose, an electrical power distribution network can be used with advantage to transmit frequencies other than the fundamental power frequency for data purposes.

One system for accomplishing such data transmission is disclosed in an article entitled "Data Transmission over Distribution Systems" by A. J. Baggott, *Electrical Times Mar.* 12, 1970. The power transmission frequency of the distribution network is used as the carrier waveform. Information signals are encoded on the carrier by selectively distorting the carrier waveform.

The distortions of the carrier waveform are formed by using a thyristor to switch a resistive, capacitive, or inductive load between two power lines. The system for transmitting data described in the aforementioned article is particularly adapted to transmit such data in the direction of energy flow in the power supply network.

A similar system for the transmission of data in an electrical supply network is disclosed in Swiss Patent No. 404,775. In the system of Swiss Patent No. 404,775, data is transmitted in a direction counter to that of the energy flow. The data carrying signals are generated by switching a capacitive load between two power lines.

It is an object of the present invention to provide an improved method for forming and transmitting information carrying signals in an electric power distribution network, which method would:

(a) involve the use of simple and inexpensive electrical components,
(b) produce information carrying signals of low harmonic content, so that requirements relating to cross-talk are easily met, and
(c) offer improved energy exploitation, and
(d) economize costs.

SUMMARY OF THE INVENTION

In accordance with a preferred embodiment of the invention, an information carrying signal is formed in an electrical power supply network by sequentially switching at least two purely ohmic loads between a pair of power lines. The loads are switched in accordance with a predetermined sequence under the control of a microcomputer or other control logic circuitry so as to generate a step-shaped information carrying current signal. Preferably, the information carrying current signal is formed during one-half cycle of a power transmission waveform of the electrical power distribution network. The step-shaped current signal generally has a frequency which is significantly higher than the frequency of the power transmission waveform.

The above-described method enables the production of current signals within the 5 kilohertz to 15 kilohertz range. Such current signals easily fit within one half-cycle of the power transmission frequency, which frequency is generally in the 50–60 hertz range. Such current signals are suitable for transferring information in a direction counter to the direction of energy flow in the network. Information may be transferred from a low tension part of the network to a high tension part of the network by means of transformers arranged between the low tension and high tension portions of the network. Illustratively, the current signals produced in accordance with the inventive method approximate sine curves, thereby resulting in improved energy exploitation. Finally, the current signals have a reduced harmonic content so that problems resulting from cross talk with other parts of the network are minimized.

DETAILED DESCRIPTION OF THE INVENTION

Figure 1:
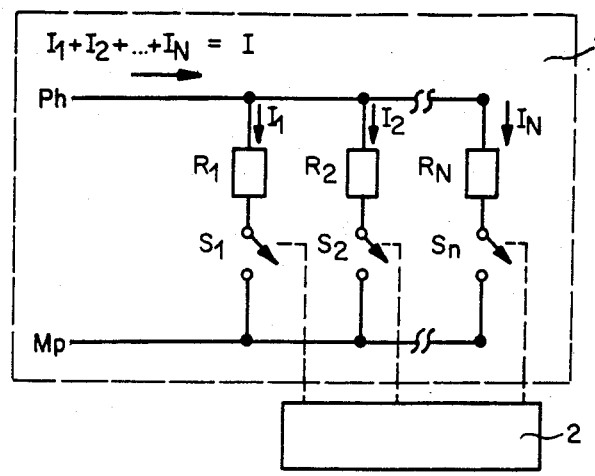
FIG. 1 schematically illustrates an apparatus for originating information carrying signals in an electrical supply network by sequentially switching a plurality of resistances between two power lines in accordance with an illustrative embodiment of the invention.

With reference to FIG. 1, an apparatus 1 for generating information carrying signals in an electrical power supply network comprises substantially pure ohmic resistances $R_1$, $R_2$ through $R_N$. The resistances $R_1$ through $R_N$ are directly connected to a first power line, for example a phase line, designated Ph. The resistances $R_1$ through $R_N$ are also connected to a second power line by means of switches $S_1$, $S_2$ through $S_N$, respectively. The second power line may be a neutral line which is designated Mp in FIG. 2.

The control logic circuitry 2 determines the time intervals during which each of the individual switches $S_1$ through $S_N$ is closed and, consequently, the time intervals during which each of the individual resistances $R_1$ through $R_N$ is switched between the power lines designated Ph and Mp. Preferably the control logic 2 is a microcomputer although other types of control logic circuitry known to those skilled in the art may also be used. At any particular instant in time, the information carrying current signal I produced by the sequential closing and opening of switches $S_1$, $S_2$ through $S_N$ is the sum of the individual currents $I_1$, $I_2$ through $I_N$ passing through the individual resistances $R_1$, $R_2$ through $R_N$.

Figure 2:
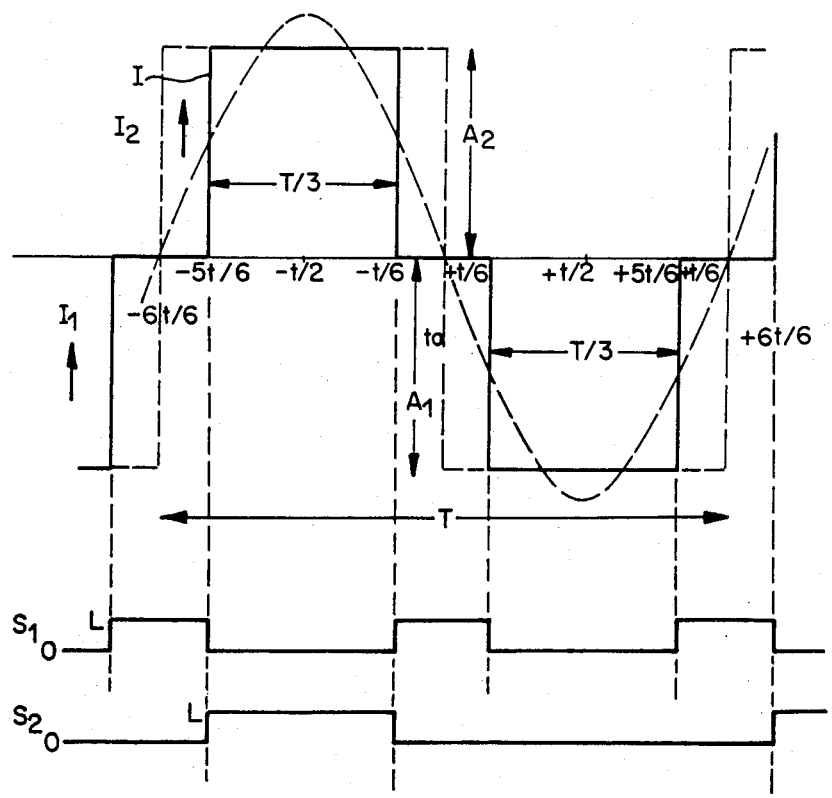
FIG. 2 schematically illustrates a sequence for switching two of the resistances of FIG. 1 and the resulting current signal.

FIG. 2 shows the step-shaped current signal I (solid step-shaped curve) which is produced when two resistances $R_1$ and $R_2$ are switched by means of switches $S_1$ and $S_2$ between the power lines Ph, Mp in accordance with a particular time sequence. As previously indicated, the opening and closing of switches $S_1$ and $S_2$ is under the control of logic circuitry 2. The total current signal I is determined at any time by the addition of the partial currents $I_1$ and $I_2$ flowing through the resistances $R_1$ and $R_2$ respectively. One oscillation of current signal I has a period T, which period T extends from the time designated $-6t/6$ to the time designated $+6t/6$ in FIG. 2. It is assumed that the resistances $R_1$, $R_2$ are in a ratio of 2:1.

The switching sequence for the switches $S_1$ and $S_2$ is illustrated at the bottom of FIG. 2. The switches $S_1$ and $S_2$ are open during the time intervals indicated by the level "0" and are closed during the time intervals indicated by the level L.

Thus, in the time interval from $-6t/6$ to $-5t/6$ switch $S_1$ is closed and switch $S_2$ is open so that a current $I_1$ of magnitude $A_1$ flows through resistance $R_1$ and no current flows through resistance $R_2$. In the interval from $-5t/6$ to $-t/6$, switch $S_1$ is open and switch $S_2$ is closed so that resistance $R_2$ is connected between the power lines Ph, Mp. Accordingly, during the interval $-5t/6$ to $-t/6$, a current $I_2$ of magnitude $A_1+A_2$ flows between the power lines Ph and $M_p$. The resistance $R_2$ draws a larger current than the resistance $R_1$ because resistance $R_2$ is smaller by a factor of two. In the interval from $-t/6$ to $+t/6$, $S_1$ is closed and $S_2$ is open so that a current $I_1$ of magnitude $A_1$ flows through resistance $R_1$. Similarly, in the interval between $+t/6$ and $+5t/6$, both $S_1$ and $S_2$ are open so that neither of the resistances $R_1$, $R_2$ is connected between the power lines Ph, Mp and the partial currents $I_1$ and $I_2$ are both zero. Finally, during the interval from $+5t/6$ to $+6t/6$ the switch $S_1$ is closed so that a current $I_1$ of magnitude $A_1$ flows through resistance $R_1$.

As can be seen from FIG. 2, one oscillation of the currently signal I comprises two oppositely directed half oscillations extending from $-6t/6$ to $t_o$ to and from $t_o$ to $+6t/6$, respectively. The two-step, step-shaped current signal I closely approximates a sine curve of period $T=12t/6$, which curve is shown in FIG. 2 as a dotted line.

During one period of oscillation T of the current signal I, the resistance $R_1$ is switched between the power lines Ph, Mp for an amount of time equal to T/3 and the resistance $R_2$ is switched between the power lines Ph, Mp for an amount of time equal to T/3. During a further amount of time equal to T/3, both switches $S_1$ and $S_2$ are open and neither resistance is switched between the power lines Mp, Ph.

As an alternative to using resistances $R_1$, $R_2$, which are in a ratio of 2:1, other values of the resistances $R_1$, $R_2$ may be used to generate the current signal I of FIG. 1. The switching sequence of switches $S_1$, $S_2$ should, of course, be chosen based on the values of resistances $R_1$, $R_2$. For example, the current signal I of FIG. 2 can be produced using the switching sequences of FIGS. 3a, 3b, 3c when the resistances $R_1$, $R_2$ are equal in size.

Figure 3A:
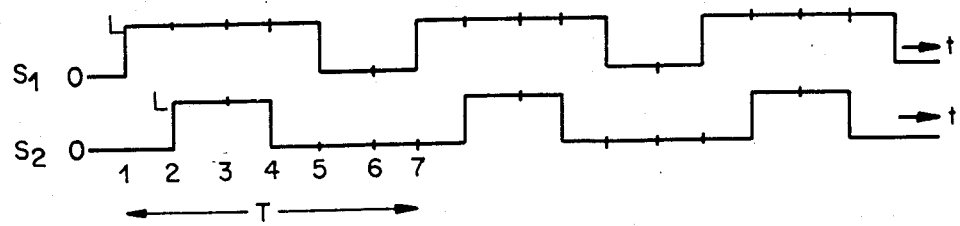
FIGS. 3a through 3c illustrate alternative sequences for switching two of the resistances of FIG. 1 to produce the current signal of FIG. 2.
Figure 3B:
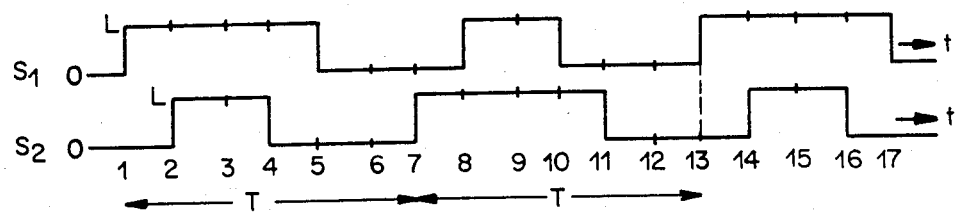
Figure 3C:
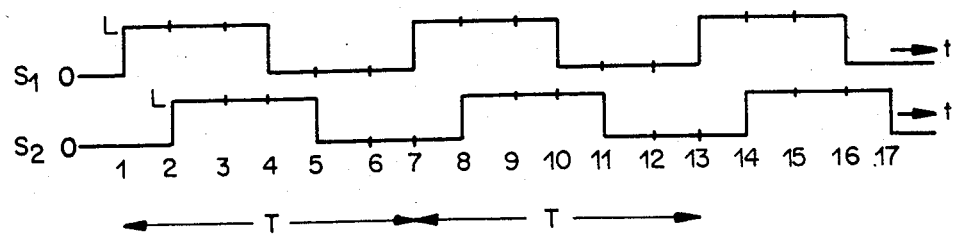

In each of the FIGS. 3a, 3b and 3c, the state of the switches $S_1$ and $S_2$ has been illustrated, wherein 0 represents an open switch $S_1$, $S_2$ and L a closed switch $S_1$, $S_2$.

In FIG. 3a, the oscillation period T of the current signal I extends from the time designated $t_1$ to the time designated $t_7$. Switch $S_1$ is closed during the interval from $t_1$ to $t_5$, during which interval resistance $R_1$ is switched between the power lines Ph and Mp. Switch $S_2$ is closed during the intervals $t_2$ to $t_4$, during which interval the resistance $R_2$ is switched between the power lines Ph and Mp. Switch $S_1$ is open from $t_5$ to $t_7$ and switch $S_2$ is open from $t_1$ to $t_2$ and from $t_4$ to $t_7$. The two switches $S_1$ and $S_2$ are both closed simultaneously during the interval from $t_2$ to $t_4$. As can be seen from FIG. 3a, the switch $S_1$ is closed for two-thirds of the period T, while the switch $S_2$ is closed for one-third of the period T. Thus, resistances $R_1$ and $R_2$ are unevenly loaded in view of the different lengths of time during which the switches $S_1$, $S_2$ are closed.

To load the resistances $R_1$, $R_2$ evenly, one may use the switching sequence of FIG. 3b. During a first period T of the current signal I, the switch $S_1$ will be closed from $t_1$ to $t_5$ and the switch S will be closed during $t_2$ to $t_4$. In the following period T, switch $S_1$ will be closed only from $t_8$ to $t_{10}$, but switch $S_2$ will be closed from $t_7$ to $t_{11}$. This alternating sequence repeats itself in the following periods T.

In the switching program illustrated in FIG. 3c, the resistances $R_1$, $R_2$ are also equally loaded. In particular, the switches $S_1$, $S_2$ are closed for equally long intervals. Howevers, as shown in FIG. 3c, the intervals during which switch $S_1$ is closed do not entirely overlap the equally long intervals during which switch $S_2$ is closed. The closing intervals of switch $S_2$ are displaced from the closing intervals of switch $S_1$ by one-third the duration of the intervals. Thus, switch $S_1$ is closed from $t_1$ to $t_4$, $t_7$ to $t_{10}$ and so on. Switch $S_2$, by contrast, is closed from $t_2$ to $t_5$, $t_8$ to $t_{11}$ and so forth. Both switches $S_1$, $S_2$ are open at the same time during the periods $t_5$ to $t_7$, $t_{11}$ to $t_{13}$ and so forth.

Preferably, the frequency of the information carrying current signal oscillation of FIG. 2 is independent of the power transmission frequency of the power supply network or any harmonic thereof. Typically, the frequency of the current signal oscillation I is in the range of 5 kHz to 15 kHz. This is considerably higher than the power transmission frequency of the supply network, which is typically in the range of 50 Hz to 60 Hz. Thus, a single oscillation of the current signal I can easily fit within a half oscillation of a power transmission waveform of the supply network. The current signal I can be formed during one or both half oscillations of the power transmission waveform. Detection of such current signals may be accomplished by conventional means known to those skilled in the art.

As indicated above, the current signal I shown in FIG. 2 has a waveform which approximates a sine curve. For this reason, the energy utilization of the two-step, step-shaped current signal of FIG. 2 is improved in comparison to that of a purely rectangular oscillation. The current signal I is of low harmonic content. Any higher harmonics contained in the current signals have relatively low amplitudes so that cross talk problems are limited. Furthermore, the current signal I may be formed in a low-tension part of the network and transferred by way of transformers to a higher tension part of the network.

In a particular embodiment of the invention, it may be desirable to sequentially produce several current signals, wherein each successive current signal has a different frequency corresponding to a different type of information. Illustratively, a second current signal may be formed by employing resistances $R_3$, $R_4$ (not shown). The resistances $R_3$, $R_4$ may be similar in size to or larger that the resistances $R_1$, $R_2$. The resistances $R_3$, $R_4$ are sequentially switched between the power lines Ph, Mp by means of switches $S_3$, $S_4$ (not shown). Illustratively, the control logic circuitry 2 is programmed so that the switching sequence of switches $S_3$ and $S_4$ produces a second current signal of a frequency different from that of the first current signal which results from the switching sequence of switches $S_1$ and $S_2$. Detection is simplified when the first current signal (produced by switches $S_1$, $S_2$) is not in a harmonic relationship with the second current signal (produced by switches $S_3$, $S_4$).

Figure 4:
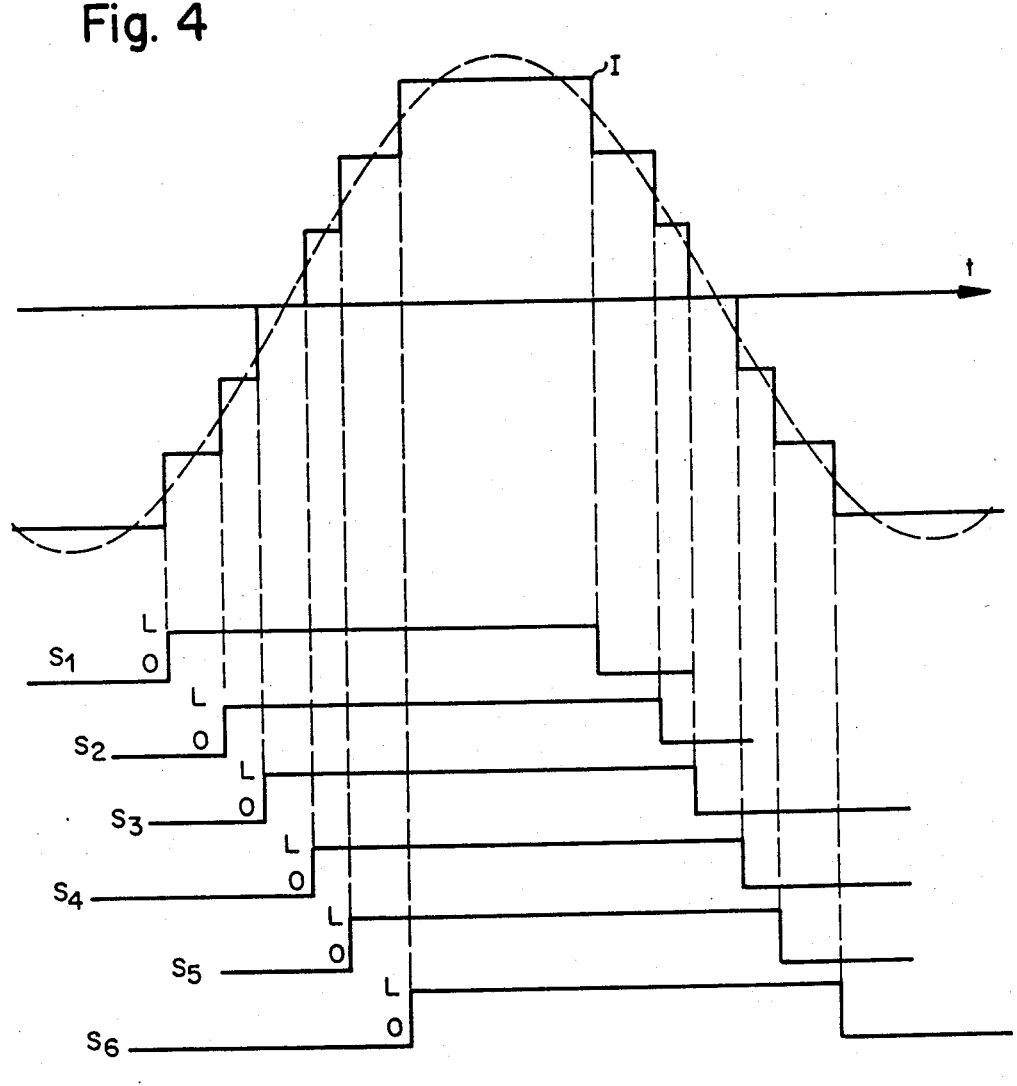
FIG. 4 illustrates the type of signal current which may be produced when more than two resistances are sequentially switched between the power lines of FIG. 1.

Approximation of the current signal I to the sine shape can be further improved if more than two resistances are used. FIG. 4 shows a half-wave of the step-shaped flow of current I, when six resistances $R_1$ through $R_6$ are sequentially switched between power lines Ph, Mp by way of switches $S_1$ through $S_6$. The ideal sine waveform is illustrated in FIG. 4 as a dotted line. Near the bottom of FIG. 4, the switching sequence of switches $S_1$ to $S_6$ has been schematically illustrated. The level "0" represents an interval in which a switch is open. The level "L" represents an interval during which a switch is closed. As can be seen in FIG. 4, the switches $S_1$ through $S_6$ are closed for unequal intervals of time. This is provided for in the control logic circuit 2 of FIG. 1. For example, if the control logic circuit 2 is a microcomputer, the intervals during which the switches $S_1$ through $S_6$ are closed are determined by a program stored in the microcomputer. Such programming is known to those skilled in the art and need not be further explained here. The total current I flowing through all the resistances $R_1$ to $R_6$ at any given moment is obtained by adding the individual partial currents flowing through each of the resistances $R_1$ to $R_6$ at the given moment.

In an alternative embodiment of the invention, a current signal I of similar shape to that illustrated in FIG. 4 can be produced by means of resistances $R_1$ through $R_N$. The resistances $R_1$ through $R_N$ are sequentially switched between the power lines Ph, Mp by switches $S_1$ through $S_N$ for equal intervals. This may be accomplished in particular cases by reprogramming the control logic circuit 2. Advantageously, the resistances and intervals may be arranged so that a digital to analog conversion can occur.

Finally, the above described embodiments of the invention are intended to be illustrative only. Numerous alternative embodiments may be devised by those skilled in the art without departing from the from the spirit and scope of the following claims.

I claim:
1. A method for forming an information carrying signal, comprising a group of step-shaped, approximated sine curves, in an alternating current electrical power supply distribution network, said method comprising the steps of sequentially switching at least two substantially pure ohmic loads between a pair of power lines of said network, said loads being switched under the control of control logic circuitry in accordance with a pre-determined sequence during at least one-half cycle of a power transmission waveform of said network to generated a step-shaped current signal whose frequency is substantially higher than the frequency of said power transmission waveform.

2. The method of claim 1 wherein said at least two substantially pure ohmic loads comprise first and second resistances $R_1$ and $R_2$, said resistances $R_1$, $R_2$ being sequentially switched between said pair of power lines by way of first and second switches $S_1$ and $S_2$ respectively.

3. The method of claim 2 wherein said resistances $R_1$ and $R_2$ are in a ratio of about 2:1.

4. The method of claim 3 wherein said stepped-shaped current signal has a predetermined period of oscillation T and wherein during each period T, said first switch $S_1$ is closed for an amount of time T/3, said second switch is closed for an amount of time T/3, and both switches $S_1$, $S_2$ are simultaneously open for an amount of time T/3.

5. The method of claim 4 wherein said current signal I is the sum of a first partial current $I_1$ which flows through said first resistance $R_1$ and a second partial current $I_2$ which flows through said second resistance $R_2$, and wherein during each period T said first partial current flows for an amount of time T/3, said second partial current flows for an amount of time T/3 and neither partial current $I_1$, $I_2$ flows for an amount of time T/3.

6. The method of claim 2 wherein said first and second resistances $R_1$, $R_2$ are of substantially equal size.

7. The method of claim 6 wherein said step-shaped current signal has a predetermined period of oscillation T and wherein during each period T said first switch $S_1$ is closed for substantially twice as much time as said second switch $S_2$.

8. The method of claim 6 wherein said step-shaped current signal endures for at least two periods of oscillation, each period of oscillation having a predetermined duration T and wherein during said first period of oscillation said first switch is closed for substantially twice as much time as said second switch and during said second period of oscillation said second switch is closed for substantially twice as much time as said first switch.

9. The method of claim 6 wherein said step-shaped current signal has a predetermined period of oscillation T and wherein during each period T said switches $S_1$, $S_2$ are closed for equally long but only partially overlapping intervals of time.

10. The method of claim 1 wherein N resistances $R_1$ to $R_N$ are sequentially switched between said power lines by means of corresponding switches $S_1$ to $S_N$, N being greater than 2.

11. The method of claim 10 wherein information carrying signals of more than one frequency are produced, each of said frequencies corresponding to a different type of information.

12. A method for forming an information carrying signal, in an alternating power supply distribution network, said method comprising the steps of sequentially switching at least two substantially pure ohmic loads between a pair of power lines of said network, said loads being switched under the control of control logic circuitry in accordance with a predetermined sequence during at least one-half cycle of a power transmission waveform of said network to generate at least one step-shaped signal approximating a sine curve, thereby generating said information carrying signal, and transmitting said information carrying signal through the network in a direction opposite to the direction of power flow in the network.

13. A method for forming an information carrying signal, comprising at least one step-shaped, approximate sine curve, in an alternating current electrical power supply distribution network, said method comprising the steps of sequentially switching at least two substantially pure ohmic loads between a pair of power lines of said network, said loads being switched under the control of control logic circuitry in accordance with a pre-determined sequence during at least one-half cycle of a power transmission waveform of said network to generate a step-shaped current signal whose frequency is substantially higher than the frequency of said power transmission waveform.

14. A method for forming information carrying signals in an alternating current electrical power distribution network, said method comprising the steps of sequentially switching a plurality of substantially pure ohmic loads arranged in groups between a pair of power lines of said network, said loads being switched under the control of control logic circuitry in accordeance with a predetermined sequence during at least one-half cycle of a power transmission waveform of said network to generate a group of step shaped approximately sine shaped information carrying signals, having frequencies substantially higher than the frequency of said power transmission waveform.

15. The method of claim 14, wherein said step shaped approximately sine shaped information carrying signals are transmitted in a direction opposite to that of the direction of power flow in said network.

16. The method of claim 14, wherein said power lines are a phase lead and a neutral wire.

* * * * *